United States Patent [19]
Yoshida

[11] Patent Number: 6,024,914
[45] Date of Patent: Feb. 15, 2000

[54] PROCESS FOR PRODUCTION OF ANODE FOR SOLID ELECTROLYTIC CAPACITOR

[75] Inventor: Katsuhiro Yoshida, Tokyo, Japan

[73] Assignee: NEC Corporation, Tokyo, Japan

[21] Appl. No.: 09/144,265

[22] Filed: Aug. 31, 1998

[30] Foreign Application Priority Data

Sep. 1, 1997 [JP] Japan .................................. 9-236126

[51] Int. Cl.$^7$ .................................................. B22F 7/00
[52] U.S. Cl. ................................ 419/23; 419/37; 419/38; 419/60; 419/33; 419/10
[58] Field of Search .................. 419/23, 33, 36, 419/37, 38, 40, 60, 2

[56] References Cited

U.S. PATENT DOCUMENTS

| | | |
|---|---|---|
| 3,473,915 | 10/1969 | Pierret . |
| 3,476,557 | 11/1969 | Fincham . |
| 3,934,179 | 1/1976 | Pierret . |
| 4,968,481 | 11/1990 | Rerat .......................................... 419/23 |

FOREIGN PATENT DOCUMENTS

| | | |
|---|---|---|
| 4-136102 | 5/1992 | Japan . |
| 5-65502 | 3/1993 | Japan . |

*Primary Examiner*—Ngoclan Mai
*Attorney, Agent, or Firm*—Sughrue, Mion, Zinn, Macpeak & Seas, PLLC

[57] ABSTRACT

Conventional anodes for solid electrolytic capacitor have small numbers of spaces and gaps therein and, when made into a capacitor, have shown insufficient (high) tan d and ESR. An anode having enlarged numbers of spaces and gaps and giving a capacitor of improved tan d and ESR can be produced by using, as a material for shaped material (anode before sintering), a mixed powder of a granulated valve metal powder of 50 to 200 $\mu$m in particle diameter and a solid organic substance of 20 $\mu$m or less in average particle diameter.

9 Claims, 4 Drawing Sheets

A: ORDINARY GRANULATED POWDER (NO SIEVING)
B: GRANULATED POWDER OF 50 μm OR LESS
C: GRANULATED POWDER OF 50 TO 200 μm
D: GRANULATED POWDER OF 200 μm OR MORE

PROCESS FOR PRODUCTION OF ANODE FOR SOLID ELECTROLYTIC CAPACITOR

FIELD OF THE INVENTION

The present invention relates to a process for producing an anode for solid electrolytic capacitor, particularly an anode using a valve action metal powder.

DESCRIPTION OF THE RELATED ART

Anodes used in conventional solid electrolytic capacitors are obtained by mixing a powder 2 of valve metal (e.g. tantalum, niobium or titanium) with a liquid binder 3 to give rise to granulation of the valve metal powder 2, subjecting the granulated material to compression molding to obtain a shaped material, implanting an anode lead 5 in the shaped material (see FIG. 3), and sintering the resulting material at a high temperature under a high vacuum. 1d' of FIG. 4 is an anode obtained by the above sintering.

In the above production of anode for conventional solid electrolytic capacitor, a liquid binder is used in order to enhance the fluidity and moldability of the valve metal powder.

In Japanese Patent Application Kokai (Laid-Open) No. 136102/1992 is disclosed a technique of subjecting the granulated material obtained after mixing a valve metal powder with a liquid binder, to sieving to obtain a granulated powder of higher fluidity having particle diameters of 20 to 400 $\mu$m. Also in Japanese Patent Application Kokai (Laid-Open) No. 65502/1993 is disclosed a method for subjecting a tantalum powder to granulation by the use of a fluidized bed granulator, wherein granulation is conducted by spraying an inorganic binder (e.g. water or phosphoric acid) and subsequent granulation is conducted by spraying an organic binder (e.g. a PVA). In this method, it is considered to utilize agglomeration by the inorganic binder and the adhesivity of the organic binder.

The first problem of the prior art is as follows. The liquid binder used for granulation of a valve metal powder in production of an anode for conventional solid electrolytic capacitor, is allowed to adhere onto the particle surface of granulated powder in a very thin film and can allow the granulated powder to have improved fluidity; however, is unable to improve the tan d and ESR of solid electrolytic capacitor.

The reason is as follows. With the liquid binder adhering onto the particle surface of granulated powder in a very thin film, the anode for solid electrolytic capacitor obtained by sintering has no sufficiently large gaps between the particles of granulated powder, making impossible the sufficient impregnation of a solid electrolyte into the gaps.

The second problem of the prior art is as follows. By using, in formation of an anode for solid electrolytic capacitor, a granulated powder of a valve action metal powder having particle diameters of 20 to 400 $\mu$m, obtained by sieving, as seen in Japanese Patent Application Kokai (Laid-Open) No. 136102/1992, the granulated powder can have improved fluidity; however, with the powder, it is difficult to provide a solid electrolytic capacitor of improved tan d and ESR.

The reason is as follows. Sieving of granulated powder can remove very small particles and makes large the gaps between particles as compared with before sieving; however, these large gaps are made very small by the compression conducted in the formation of anode for solid electrolytic capacitor, and the gaps after the compression are nearly the same as when no sieving is conducted.

The third problem of the prior art is that mere addition of a solid organic substance to the unsieved granulated powder (having a particle size distribution of 1 to 500 $\mu$m) shows no improvement in tan d or ESR.

The reason is as follows. The solid organic substance added to the granulated powder vaporizes during the sintering of the shaped material for formation of anode and forms a large number of spaces; these spaces are separated and made independent because the gaps in the vicinity of each space are filled by the very small particles of granulated powder, allowing for no sufficient impregnation of solid electrolyte.

Thus, the object of the present invention is to provide a process for producing an anode for solid electrolytic capacitor, capable of giving a solid electrolytic capacitor of improved tan d and ESR.

SUMMARY OF THE INVENTION

According to the present invention, there is provided a process for producing an anode for solid electrolytic capacitor, which comprises:

a step of subjecting a valve metal to compression molding and implanting an anode lead in the resulting material, to form a shaped material, and a step of sintering the shaped material at a high temperature in a high vacuum, in which process the shaped material is formed by using an agglomerated or granulated powder of a valve metal and a solid organic substance, in combination.

Preferably in the present process, the agglomerated or granulated powder has particle diameters of 50 to 200 $\mu$m, and the solid organic substance has an average particle diameter of 20 $\mu$m or less and is used in an amount of 1 to 10% by weight based on the weight of the anode to be produced.

Also preferably in the present process, the solid organic substance undergoes complete pyrolysis under the sintering conditions used in sintering the shaped material, and is a polyvinyl alcohol, an acrylic substance or camphor.

According to one embodiment of the present invention, there is provided a process for producing an anode for solid electrolytic capacitor, which comprises:

a step of mixing a valve metal powder having a particle size distribution of 1 to 300 $\mu$m with a liquid binder, subjecting the resulting mixture to granulation, sieving the resulting material to obtain a granulated powder having particle diameters of 50 to 200 $\mu$m, mixing, into the granulated powder, a solid organic substance having an average particle diameter of 20 $\mu$m or less, in an amount of 1 to 10% by weight based on the weight of the anode to be produced, and implanting an anode lead in the resulting material to form a shaped material, and a step of sintering the shaped material at a high temperature under a high vacuum.

A solid electrolytic capacitor using the anode produced by the process of the present invention shows a tan d and an ESR both lower by about 5 to 40%. FIGS. 6 and 7 indicate such an effect of the present invention.

The reason for the above effect of the present invention is as follows. The anode for solid electrolytic capacitor, produced by the present process uses, as a material, a mixed powder of a valve metal powder having particle diameters of 50 to 200 $\mu$m and 1 to 10% by weight, based on the weight of the anode to be produced, of a solid organic substance having an average particle diameter of 20 $\mu$m or less; therefore, sufficient spaces and gaps are secured in the anode after sintering; these spaces and gaps enable easy impregnation of a solid electrolyte into the anode during the formation of a cathode layer; moreover, the impregnation can be made in a large impregnation thickness.

DETAILED DESCRIPTION OF THE INVENTION

Figure 1A:
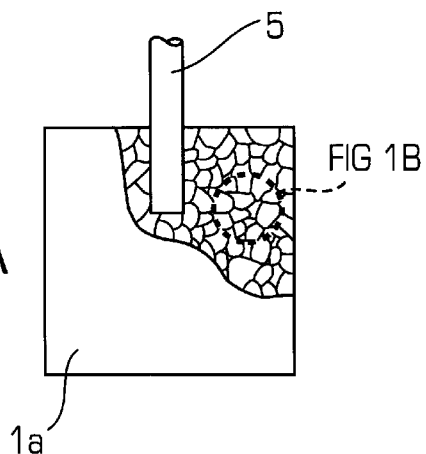
FIG. 1 shows an anode (before sintering) for solid electrolytic capacitor, i.e. a shaped material, produced by the process of the Example of the present invention; and a sectional view thereof.

In general, a granulated powder, when subjected to sieving, can have enlarged gaps between the particles of granulated powder. However, when the granulated powder after sieving is subjected to compression molding as it is, to form a shaped material, the above gaps become small. Therefore, in the present invention, a solid organic substance is added as mentioned above (this is a feature of the present invention), and the solid organic substance is allowed to be present between the particles of granulated powder, at the time of compression molding; during the sintering of the resulting shaped material, the solid organic substance is removed by combustion and, as a result, spaces are formed in the sintered material (anode) and they are connected to each other by the gaps between the particles of granulated powder; this makes easy the later impregnation of a solid electrolyte into the anode.

The two steps of the present process for producing an anode for solid electrolytic capacitor, i.e. the step of subjecting a valve metal to compression molding and implanting an anode lead in the resulting material, to form a shaped material and the step of sintering the shaped material at a high temperature in a high vacuum, can each be conducted using the conditions ordinarily used.

However, in forming a shaped material, a solid organic substance must be present in an agglomerated or granulated powder; therefore, the agglomerated or granulated powder preferably has particle diameters of 50 to 200 $\mu$m. When the diameters of the powder are smaller than 50 $\mu$m, it is difficult to secure sufficient gaps between the powder particles; when the diameters of the powder are larger than 200 $\mu$m, the powder tends to lose the structure; therefore, such diameters are not preferred.

The solid organic substance has an average particle diameter of 20 $\mu$m or less, preferably about 10 $\mu$m and a particle size distribution of ordinarily 1 to 30 $\mu$m. When the average particle diameter is larger than 20 $\mu$m, the proportion of the solid organic substance having large particle diameters is high and the fine gaps in the vicinity of the solid organic substance are destroyed, which is not preferred. The solid organic substance is added in an amount of preferably 1 to 10% by weight based on the weight of the anode to be produced. When the amount is smaller than 1% by weight, the addition effect of the solid organic substance is very small; when the amount is larger than 10% by weight, large amounts of substances such as carbon and the like remain, which is not preferred.

The solid organic substance used in the present process can be any as long as it can undergo complete pyrolysis under the sintering conditions used in sintering the shaped material at a high temperature under a high vacuum. As the solid organic substance satisfying the above requirement, a number of substances can be mentioned. However, use of, in particular, a PVA type or acrylic type solid binder or camphor is preferred.

A preferred embodiment of the present process is described with reference to accompanying drawings. FIG. 1 is a sectional view of a shaped material formed according to the present process for producing an anode for solid electrolytic capacitor.

First, a valve metal powder 2 having a particle size distribution of about 1 to 300 $\mu$m is mixed with a liquid binder 3 to obtain a granulated powder 7 (non figured). Then, the granulated powder 7 is subjected to sieving to obtain a granulated powder 8 (non figured) ordinarily having particle diameters of 50 to 200 $\mu$m. The granulated powder 8 is mixed with a solid organic substance 4 having an average particle diameter of 20 $\mu$m or less, of an amount of 1 to 10% by weight based on the weight of the anode to be produced, to obtain a mixed powder. Into the mixed powder is implanted an anode lead 5, and the resulting material is subjected to compression molding to form a shaped material 1a (FIG. 1). The shaped material 1a is sintered at a high temperature under a high vacuum, whereby an anode 1b (FIG. 2) for solid electrolytic capacitor can be obtained.

Figure 4A:
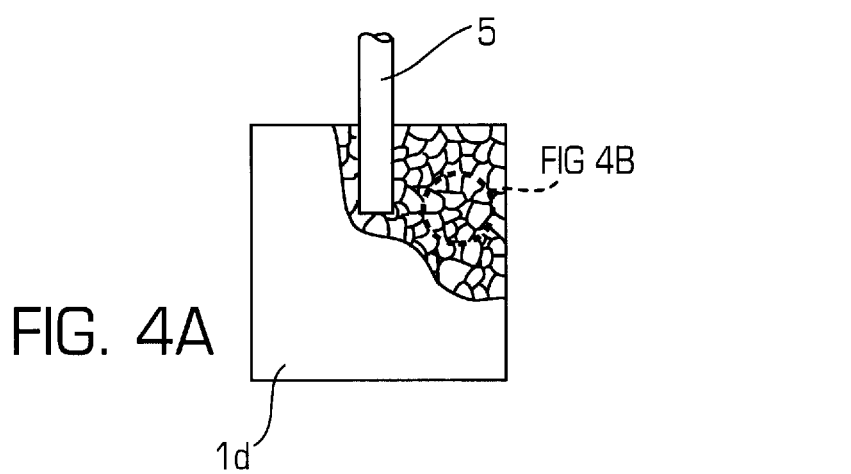
FIG. 4 shows an anode (after sintering) for solid electrolytic capacitor, produced by a conventional process; and a sectional view thereof.
Figure 4B:
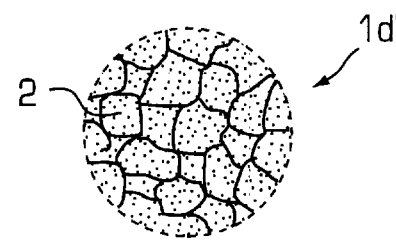

Using this anode 1b and employing a known process for production of a solid electrolytic capacitor, there are formed an oxide film layer, a solid electrolyte layer, a graphite layer and a cathode layer (e.g. a silver paste layer) in this order. In the present anode for solid electrolytic capacitor, as compared with the case of an anode 1d of FIG. 4 obtained by a conventional process, the number of gaps present at the surface of and inside the anode is larger; this invites higher impregnation of solid electrolyte into anode; as a result, the resulting solid electrolytic capacitor is lower in tan d and ESR by about 5 to 40% than conventional products.

EXAMPLE

The Example of the present invention is described in detail below with reference to accompanying drawings.

FIG. 1 is a sectional view of a shaped material formed according to the present process for producing an anode for solid electrolytic capacitor. In FIG. 1, 1a is a shaped material before sintering, and 1a' is a partially enlarged view of FIG. 1.

Figure 5:
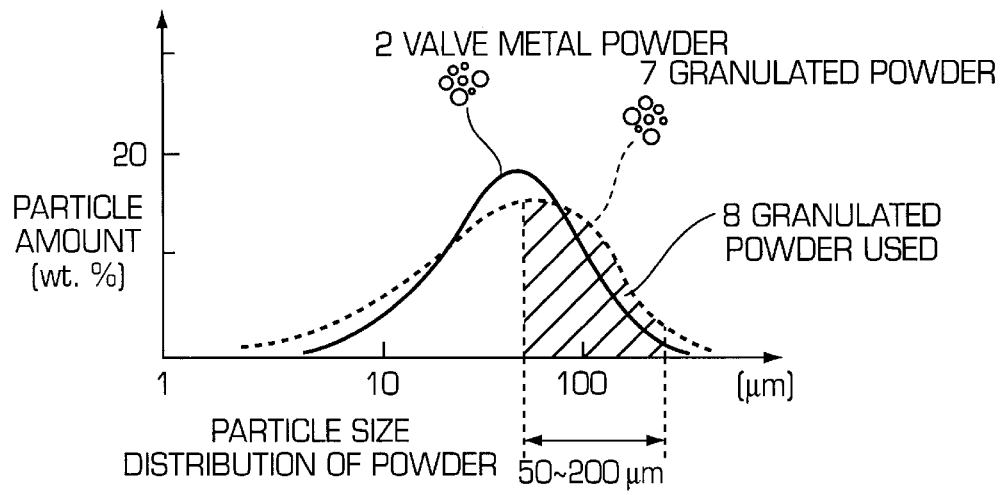
FIG. 5 is a graph showing the particle size distributions of an ordinary valve metal powder and a granulated powder used as an anode material in the present invention.

In a first step, a valve metal (e.g. Ta or Al) powder 2 having a particle size distribution of about 1 to 300 $\mu$m is mixed with 1 to 3% by weight, based on the weight of the anode to be produced, of a liquid binder 3 obtained by dissolving a PVA, a PVB or the like in a solvent (e.g. methyl cellosolve); and the resulting mixture is subjected to granulation to obtain a granulated powder 7 having a particle size distribution of about 1 to 500 μm. In a second step, the granulated powder 7 is subjected to sieving to obtain a granulated powder 8 having particle diameters of 50 to 200 μm. FIG. 5 shows a relation between the granulated powder 7 and the granulated powder 8.

To the granulated powder 8 is added 1 to 10% by weight, based on the weight of the anode to be produced, of a solid organic substance (e.g. a PVA or camphor) having an average particle diameter of 20 μm or less, and they are mixed by ordinarily using a V-shaped mixer or the like.

Figure 1B:
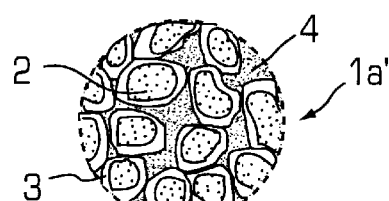
Figure 2A:
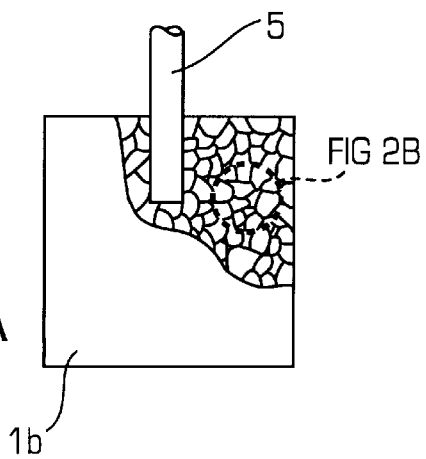
FIG. 2 shows an anode (after sintering) for solid electrolytic capacitor, produced by the process of the Example of the present invention; and a sectional view thereof.
Figure 2B:
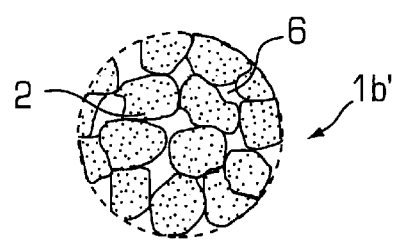
Figure 3A:
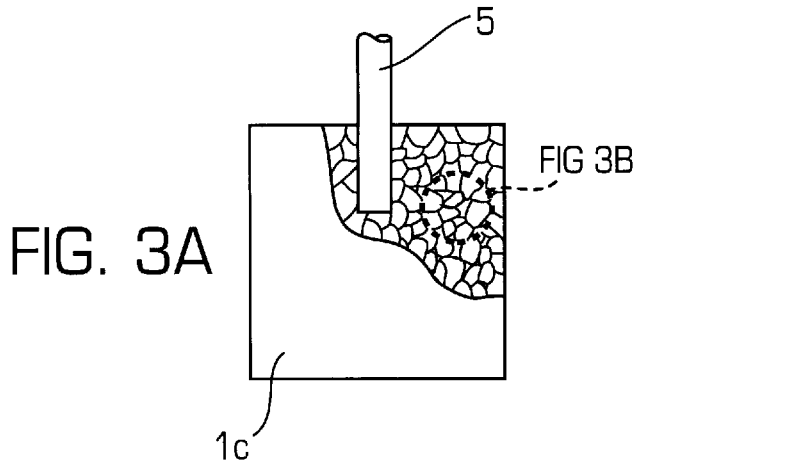
FIG. 3 shows an anode (before sintering) for solid electrolytic capacitor, i.e. a shaped material, produced by a conventional process; and a sectional view thereof.
Figure 3B:
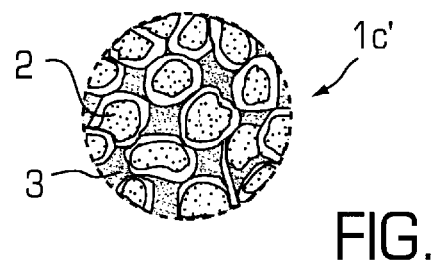

FIG. 2 shows an anode for solid electrolytic capacitor, obtained by sintering the shaped material of FIG. 1 by a known method. In FIG. 2, 1b is a shaped material after sintering, and 1b' is a partially enlarged view of 1b.

Figure 6:
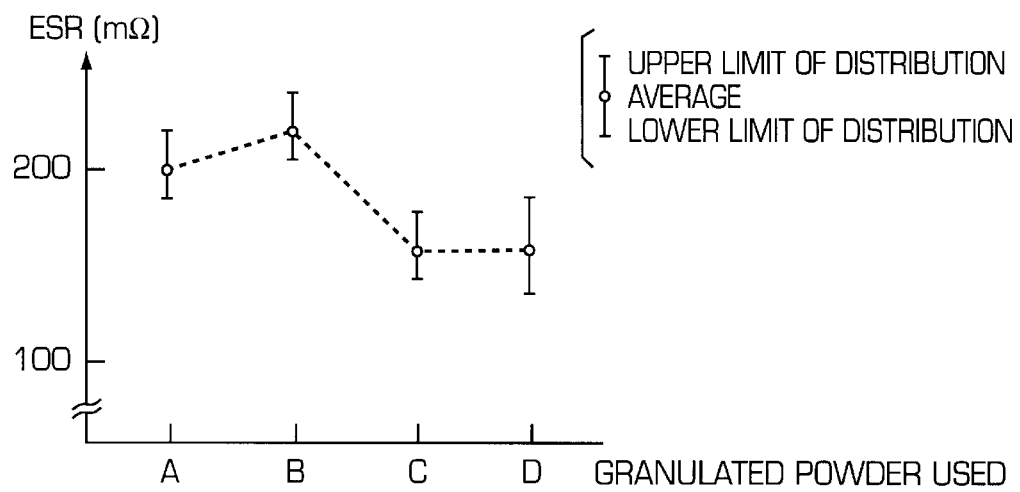
FIG. 6 is a graph showing a relation between (1) the particle diameter of granulated powder used in anode for solid electrolytic capacitor and (2) ESR.

FIG. 6 is a graph showing a relation between particle diameter of granulated powder and ESR, examined on four kinds of granulated powders A to D. Incidentally, ESR was measured according to items 7.8 and 7.11 of JIS C 5102-1994. In the test of FIG. 6, the granulated powders B to D each contained 5% by weight of a solid binder, but the granulated powder A contained no solid binder. In FIG. 6, it is indicated that an ESR-lowering effect appears even in a region of 200μm or more (the granulated powder D) which exceeds the preferable region (50 to 200μm) of the present invention; however, with such a granulated powder, the weight of powder used in anode fluctuates greatly, causing a fluctuation in the capacity of the resulting capacitor; therefore, such a granulated powder is unusable.

Figure 7:
FIG. 7 is a graph showing a relation between (1) the addition amount and particle diameter of solid binder used in anode for solid electrolytic capacitor and (2) ESR.

FIG. 7 is a graph showing a relation between addition amount and particle diameter of solid binder and ESR, examined on two kinds of of acrylic type solid binders as solid organic substance. In the test of FIG. 7, the solid binders were independently added to a granulated powder having particle diameters of 50 to 200 μm.

In the present process, the preferable amount range of the solid organic substance added is 1 to 10% by weight based on the weight of the anode to be produced. When an amount larger than that is added, the amount of metal powder in unit volume of anode becomes small, which invites a reduction in capacity, an increase in ESR, and an increase in residual carbon amount (this results in an increase in leakage current); thus, the resulting capacitor has deteriorated properties. It is also seen in FIG. 7 that an increase in the particle diameter of solid binder results in a decrease in effect of ESR decrease.

What is claimed is:

1. A process for producing an anode for solid electrolytic capacitor, which comprises:
    a step of subjecting a valve metal to compression molding and implanting an anode lead in the resulting material, to form a shaped material, and
    a step of sintering the shaped material at a high temperature in a high vacuum,
    in which process the shaped material is formed by using an agglomerated or granulated powder of a valve metal and a solid organic substance, in combination;
    and wherein particles diameters of the agglomerated or granulated powder are between 50 to 200 μm.

2. A process according to claim 1, wherein the solid organic substance has an average particle diameter of 20 μm or less and is used in an amount of 1 to 10% by weight based on the weight of the anode to be produced.

3. A process according to claim 1, wherein the solid organic substance undergoes complete pyrolysis under the sintering conditions used in sintering the shaped material.

4. A process according to claim 1, wherein the solid organic substance is selected from the group consisting of a polyvinyl alcohol, an acrylic substance and camphor.

5. A process according to claim 1, wherein the valve action metal is selected from the group consisting of tantalum, niobium and aluminum.

6. A process according to claim 1, wherein the granulated powder is obtained by mixing a valve metal powder having a particle size distribution of 1 to 300 μm, with a liquid binder and then subjecting the resulting mixture to granulation and sieving.

7. A process according to claim 6, wherein the liquid binder is obtained by dissolving a polyvinyl alcohol or a polyvinyl butyral in a solvent.

8. A process for producing an anode for solid electrolytic capacitor, which comprises:
    a step of mixing a valve metal powder having a particle size distribution of 1 to 300 μm with a liquid binder, subjecting the resulting mixture to granulation, sieving the resulting material to obtain a granulated powder having particle diameters of 50 to 200 μm, mixing, into the granulated powder, a solid organic substance having an average particle diameter of 20 μm or less, in an amount of 1 to 10% by weight based on the weight of the anode to be produced, and implanting an anode lead in the resulting material to form a shaped material, and
    a step of sintering the shaped material at a high temperature under a high vacuum.

9. A process for producing an anode for solid electrolytic capacitor, which comprises:
    a step of subjecting a valve metal to compression molding and implanting an anode lead in the resulting material, to form a shaped material, and
    a step of sintering the shaped material at a high temperature in a high vacuum,
    in which process the shaped material is formed by using an agglomerated or granulated powder of a valve metal and a solid organic substance, in combination; and
    wherein the solid organic substance has an average particle diameter of 20 μm or less and is used in an amount of 1 to 10% by weight based on the weight of the anode to be produced.

* * * * *